(12) United States Patent
Benco et al.

(10) Patent No.: US 9,078,123 B1
(45) Date of Patent: Jul. 7, 2015

(54) SYSTEMS AND METHODS FOR DETERMINING NETWORK INFORMATION ON MOBILE DEVICES

(71) Applicant: Alcatel Lucent USA, Inc., Murray Hill, NJ (US)

(72) Inventors: David Benco, New Providence, NJ (US); Boris Wirstiuk, Hackettstown, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/499,944

(22) Filed: Sep. 29, 2014

(51) Int. Cl.
 *H04M 3/00* (2006.01)
 *H04W 8/22* (2009.01)
 *H04W 24/04* (2009.01)

(52) U.S. Cl.
 CPC ............. *H04W 8/22* (2013.01); *H04W 24/04* (2013.01)

(58) Field of Classification Search
 None
 See application file for complete search history.

(56) References Cited

U.S. PATENT DOCUMENTS

| | | | |
|---|---|---|---|
| 2004/0198360 A1* | 10/2004 | Kotzin | 455/445 |
| 2012/0329472 A1* | 12/2012 | Aaron et al. | 455/452.2 |
| 2013/0072174 A1* | 3/2013 | Enty et al. | 455/418 |

* cited by examiner

*Primary Examiner* — Erika A Washington
(74) *Attorney, Agent, or Firm* — Harness, Dickey & Pierce, P.L.C.

(57) ABSTRACT

Methods and systems for adjusting at least one mode of operation of a mobile terminal based on predicted network performance parameters are provided. The methods and systems include determining, by a mobile terminal, the predicted network performance parameters based on at least one of (i) a mobile terminal parameter and (ii) environmental information. The at least one the mobile terminal parameter and the environmental information may be measured by the mobile terminal or obtained by the mobile terminal. The methods and systems include adjusting, by the mobile terminal, the at least one mode of operation based on the predicted network performance parameters.

20 Claims, 3 Drawing Sheets

SYSTEMS AND METHODS FOR DETERMINING NETWORK INFORMATION ON MOBILE DEVICES

BACKGROUND

Wireless cellular communications networks include several cells where each cell includes a base station that provides mobile communications and network services to mobile devices. In the wireless cellular networks, signals from one or more mobile devices in a cell coverage area of a base station are received by the base station, which then connects a call to a land-line telephone network and/or connects the mobile device to a network, such as the internet. In typical wireless cellular systems, when a base station connects a mobile device to the internet, a mobile application running on the mobile device is used to connect the mobile application with an internet based service provider. Such service providers may provide such as email, stock market information, weather information, media streaming, video games, GPS and/or location-based services, banking, and the like.

The explosion in number and variety of mobile applications, and the growing complexity and proliferation of mobile devices, has created an increase of bandwidth consumption. The increase in bandwidth consumption requires more sophisticated approaches to the coordination between mobile devices and the wireless network infrastructure in order to provide more efficient allocation of network resources. However, different mobile applications may have different network resource requirements to ensure a higher Quality of Experience (QoE) and/or Quality of Service (QoS) for the services the mobile application utilizes. Therefore, the methods that a mobile device and/or a mobile application may use for obtaining services and/or requesting network resources may be dependent on a type of mobile application being executed by the mobile terminal.

Current methods for allocating network resources to mobile devices are "network centric". For example, in most wireless networks, a base station may include one or more scheduling algorithms in order to allocate network resources to mobile devices within the base station's cell coverage area. Additionally, the base station may obtain information from the mobile devices within the base station's cell coverage area to better determine how to efficiently allocate the base station's network resources. However, the conventional methods for allocating resources typically do not account for mobile device and/or mobile application specific parameters for obtaining desired services and/or requesting desired network resources. In order for a network centric approach to take into account mobile device and/or mobile application specific parameters for obtaining desired services and/or requesting desired network resources, the network infrastructure may have to comply with a single and/or universal standard for allocating network resources, which may be inconvenient for each wireless network vendor to implement.

SUMMARY

At least one example embodiment relates to a method for adjusting at least one mode of operation of a mobile terminal based on predicted network performance parameters.

According to an example embodiment, a method for adjusting at least one mode of operation of a mobile terminal based on predicted network performance parameters includes determining, by the mobile terminal, the predicted network performance parameters based on at least one of (i) a mobile terminal parameter and (ii) environmental information, the at least one of the mobile terminal parameter and the environmental information being measured by the mobile terminal or obtained by the mobile terminal; and adjusting, by the mobile terminal, the at least one mode of operation based on the predicted network performance parameters.

At least one example embodiment provides that the determining includes determining current network conditions based on the environmental information.

At least one example embodiment provides that the determining includes determining current network conditions based on environmental information of another device, where the other device is at least one of proximate to the mobile terminal and attached to the mobile terminal. The environmental information of the other mobile terminal is one of measured by the mobile terminal and obtained by the mobile terminal.

At least one example embodiment provides that the determining includes determining desired application parameters of an application that is executed by the mobile terminal, where the desired application parameters being defined by the application; and monitoring current application parameters of the application. At least one example embodiment provides that the adjusting includes adjusting the at least one mode of operation of the mobile terminal according to a difference between the desired application parameters and the current application parameters.

At least one example embodiment provides that the determining the desired application parameters includes determining historical parameters associated with the application.

At least one example embodiment provides that the determining includes determining that an event has occurred on the mobile terminal, and determining historical parameters associated with the event. At least one example embodiment provides that the adjusting includes adjusting the at least one mode of operation of the mobile terminal based on the historical parameters associated with the event.

At least one example embodiment provides that the determining includes determining a current position of the mobile terminal, and determining historical parameters associated with the current position. At least one example embodiment provides that the adjusting includes adjusting the at least one mode of operation of the mobile terminal based on the historical parameters associated with the current position.

At least one example embodiment provides that the determining includes determining at least one of a movement velocity of the mobile terminal, a movement acceleration of the mobile terminal, and an orientation of the mobile terminal. The determining includes determining at least one of a predicted position, a predicted orientation, a predicted movement velocity, and a predicted acceleration based on at least one of (i) the current position and (ii) the at least one of the movement velocity, the movement acceleration, and the orientation. The determining includes determining at least one of (i) historical parameters associated with the predicted position and (ii) historical parameters associated with the at least one of the predicted movement velocity, the predicted movement acceleration, and the predicted orientation. At least one example embodiment provides that the adjusting includes adjusting the at least one mode of operation of the mobile terminal based on at least one of (i) the current position, (ii) historical parameters associated with the predicted position, and (iii) the historical parameters associated with the at least one of the predicted movement velocity, the predicted movement acceleration, and the predicted orientation.

At least one example embodiment provides that the determining includes measuring environmental factors surrounding the mobile terminal; and determining current network performance parameters based on the measured environmental factors.

At least one example embodiment provides that the determining further includes determining a rolling average for the current network performance parameters, the rolling average indicating an average value of the current network performance parameters that are measured during a desired time interval.

At least one example embodiment relates to a mobile terminal including a processor, where the processor is configured to adjust at least one mode of operation of a mobile terminal based on predicted network performance parameters.

According to an example embodiment, a mobile terminal includes a processor. The processor is configured to determine predicted network performance parameters based on at least one of (i) a mobile terminal parameter and (ii) environmental information, the at least one of the mobile terminal parameter and the environmental information being measured by the mobile terminal or obtained by the mobile terminal, and adjust at least one mode of operation based on the predicted network performance parameters.

At least one example embodiment provides that in the determining, the processor is further configured to determine current network conditions based on the environmental information.

At least one example embodiment provides that in the determining, the processor is further configured to determine current network conditions based on environmental information of another device, where the other device is at least one of proximate to the mobile terminal and attached to the mobile terminal, the environmental information of the other mobile terminal being one of measured by the mobile terminal and obtained by the mobile terminal.

At least one example embodiment provides that in the determining, the processor is further configured to determine desired application parameters of an application that is executed by the mobile terminal, the desired application parameters being defined by the application, and monitor current application parameters of the application. At least one example embodiment provides that in the adjusting, the processor is further configured to adjust the at least one mode of operation of the mobile terminal according to a difference between the desired application parameters and the current application parameters.

At least one example embodiment provides that in the determining the desired application parameters, the processor is further configured to determine historical parameters associated with the application.

At least one example embodiment provides that in the determining, the processor is further configured to determine that an event has occurred on the mobile terminal, and determine historical parameters associated with the event. At least one example embodiment provides that in the adjusting, the processor is further configured to adjust the at least one mode of operation of the mobile terminal based on the historical parameters associated with the event.

At least one example embodiment provides that in the determining, the processor is further configured to determine a current position of the mobile terminal, and determine historical parameters associated with the current position. At least one example embodiment provides that in the adjusting, the processor is further configured to adjust the at least one mode of operation of the mobile terminal based on the current position.

At least one example embodiment provides that in the determining, the processor is further configured to determine at least one of a movement velocity of the mobile terminal, a movement acceleration of the mobile terminal, and an orientation of the mobile terminal. The processor is configured to determine at least one of a predicted position, a predicted orientation, a predicted movement velocity, and a predicted acceleration based on (i) the current position and (ii) the at least one of the movement velocity, the movement acceleration, and the orientation. The processor is configured to determine at least one of (i) historical parameters associated with the predicted position and (ii) historical parameters associated with the at least one of the predicted movement velocity, the predicted movement acceleration, and the predicted orientation. At least one example embodiment provides that in the adjusting, the processor is further configured to adjust the at least one mode of operation of the mobile terminal based on at least one of (i) the current position, (ii) historical parameters associated with the predicted position, and (iii) the historical parameters associated with the at least one of the predicted movement velocity, the predicted movement acceleration, and the predicted orientation.

At least one example embodiment provides that in the determining, the processor is further configured to measure environmental factors surrounding the mobile terminal, determine current network performance parameters based on the measured environmental factors, and determine a rolling average for the current network performance parameters, where the rolling average indicates an average value of the current network performance parameters that are measured during a desired time interval.

At least one example embodiment relates to a computer-readable medium comprising program code, which when executed by a processor, configures the processor to adjust at least one mode of operation of a mobile terminal based on predicted network performance parameters.

According to an example embodiment, a computer-readable medium comprising program code is provided. When the program code is executed by a processor, the program code configures the processor to (i) adjust at least one mode of operation of the mobile terminal based on predicted network performance parameters, and (ii) determine the predicted network performance parameters without requesting network performance information from a network element.

BRIEF SUMMARY OF THE DRAWINGS

The example embodiments will become more fully understood from the detailed description given herein below and the accompanying drawings, wherein like elements are represented by like reference numerals, which are given by way of illustration only, and thus, are not limiting of the example embodiments and wherein.

DETAILED DESCRIPTION OF THE EMBODIMENTS

Figure 1:
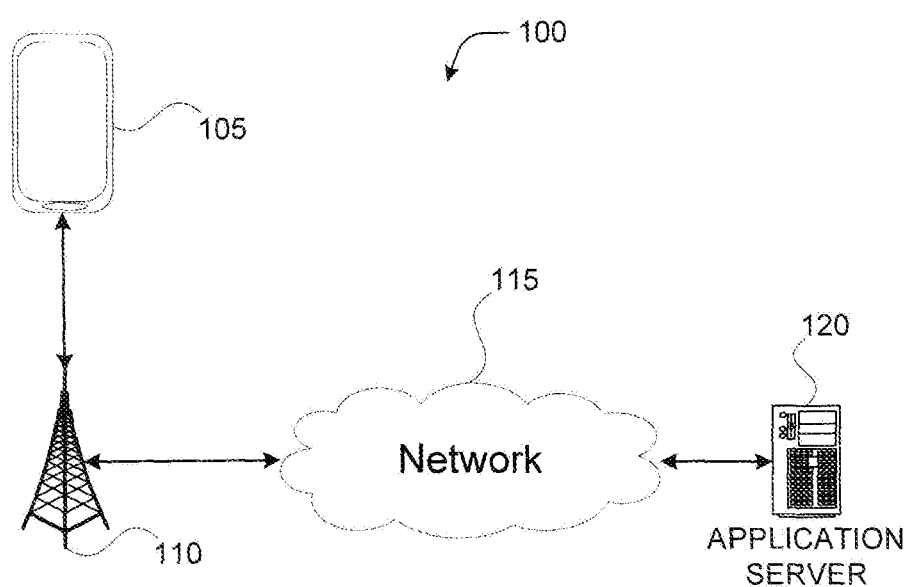
FIG. 1 illustrates an example of a communications network, according to an example embodiment.

Various example embodiments will now be described more fully with reference to the accompanying drawings in which some example embodiments of the invention are shown.

Detailed illustrative embodiments are disclosed herein. However, specific structural and functional details disclosed herein are merely representative for purposes of describing example embodiments of the present invention. This invention may, however, may be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams in order not to obscure the example embodiments in unnecessary detail. In other instances, well-known processes, structures and techniques may be shown without unnecessary detail in order to avoid obscuring example embodiments.

Also, it is noted that example embodiments may be described as a process depicted as a flowchart, a flow diagram, a data flow diagram, a structure diagram, or a block diagram. Although a flowchart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, a function, a procedure, a subroutine, a subprogram, etc. When a process corresponds to a function, its termination may correspond to a return of the function to the calling function or the main function.

Moreover, as disclosed herein, the term "memory" may represent one or more devices for storing data, including random access memory (RAM), magnetic RAM, core memory, and/or other machine readable mediums for storing information. The term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" may include, but is not limited to, portable or fixed storage devices, optical storage devices, wireless channels, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

As used herein, the term "mobile terminal" may be considered synonymous to, and may hereafter be occasionally referred to, as a client, mobile, mobile unit, mobile station, mobile user, user equipment (UE), user terminal, subscriber, user, remote station, access agent, user agent, receiver, etc., and may describe a remote user of network resources in a communications network. Furthermore, the term "mobile terminal" may include any type of wireless device such as consumer electronics devices, smart phones, tablet personal computers, wearable computing devices, personal digital assistants (PDAs), desktop computers, and laptop computers, and/or any other like physical computing device that is able to connect to a wireless communications network.

As used herein, the term "network element", may be considered synonymous to and/or referred to as a networked computer, networking hardware, network equipment, router, switch, hub, bridge, gateway, or other like device. The term "network element" may describe a physical computing device of a wired or wireless communication network and configured to host a virtual machine. Furthermore, the term "network element" may describe equipment that provides radio baseband functions for data and/or voice connectivity between a network and one or more users. The term "network element", may be considered synonymous to and/or referred to as a "base station". As used herein, the term "base station", may be considered synonymous to and/or referred to as an enhanced Node B (eNB), base transceiver station (BTS), NodeB, access point (AP), etc. and may describe equipment that provides the radio baseband functions for data and/or voice connectivity between a network and one or more users.

Example embodiments may be utilized in conjunction with RANs such as: Universal Mobile Telecommunications System (UMTS); Global System for Mobile communications (GSM); Advance Mobile Phone Service (AMPS) system; the Narrowband AMPS system (NAMPS); the Total Access Communications System (TACS); the Personal Digital Cellular (PDC) system; the United States Digital Cellular (USDC) system; the code division multiple access (CDMA) system described in EIA/TIA IS-95; a High Rate Packet Data (HRPD) system, Worldwide Interoperability for Microwave Access (WiMAX); ultra mobile broadband (UMB); $3^{rd}$ Generation Partnership Project LTE (3GPP LTE); and $4^{th}$ Generation LTE.

Example embodiments are discussed herein as being implemented in a suitable computing environment. Although not required, example embodiments will be described in the general context of computer-executable instructions, such as program modules or functional processes, being executed by one or more special purpose computer processors or general purpose processors configured to operate as a special purpose processor. Generally, program modules or functional processes include program code, routines, programs, objects, components, data structures, etc. that performs particular tasks or implement particular data types. The program modules and functional processes discussed herein may be implemented using existing hardware in existing communication networks. For example, program modules and functional processes discussed herein may be implemented using existing hardware at existing network elements or mobile terminals. Such existing hardware may include one or more digital signal processors (DSPs), application-specific-integrated-circuits, field programmable gate arrays (FPGAs) computers or the like.

FIG. 1 illustrates an example of a communications network, according to an example embodiment. Communications network 100 includes mobile terminal 105, base station 110, network 115 and server 120.

Mobile terminal 105 is a physical hardware device that is capable of running one or more applications. Mobile terminal 105 may include a transmitter/receiver (or alternatively, a transceiver), memory, one or more processors, and/or other like components. Mobile terminal 105 may be configured to send/receive data to/from base station 110. Mobile terminal 105 may be designed to sequentially and automatically carry out a sequence of arithmetic or logical operations; equipped to record/store digital data on a machine readable medium; and transmit and receive digital data via base station 110. Mobile terminal 105 may include wireless phones or smartphones, laptop personal computers (PCs), tablet PCs, wearable computing devices, and/or any other physical or logical device capable of recording, storing, and/or transferring digital data via base station 110 and/or any other like network element. Mobile terminal 105 may include a wireless transceiver configured to operate in accordance with one or more wireless communications protocols and/or one or more cellular phone communications protocols. Mobile terminal 105 may be configured to operate in accordance with the Global System for Mobile Communications (GSM), Enhanced Data GSM Environment (EDGE), wideband code division multiple access (WCDMA), code division multiple access (CDMA), time division multiple access (TDMA), Bluetooth, Wireless Fidelity (Wi-Fi) such as the Institute of Electrical and Electronics Engineers (IEEE) 802.11a, IEEE 802.11b, IEEE 802.11g, IEEE 802.11 ac, and/or IEEE 802.11n, voice over Internet Protocol (VoIP), Wi-MAX, Long Term Evolution (LTE), an email protocol such as Internet Message Access Protocol (IMAP) and/or Post Office Protocol (POP), an instance messaging such as eXtensible Messaging and Presence Protocol (XMPP), Session Initiation Protocol for Instant Messaging and Presence Leveraging Extensions (SIMPLE), Instant Messaging and Presence Service (IMPS), and Short Message Service (SMS), or any other "wireless" communication protocols, including RF-based, optical (visible/invisible), and so forth.

Mobile terminal 105 may be equipped with location (or alternatively "geolocation"), positioning, and/or navigation circuitry, such as a Global Positioning System ("GPS") receiver, as well as software to convert received GPS signals into a location and/or position (within some margin of error). In other embodiments, alternate positioning systems may be employed, such as wireless network signal-strength-based indoor positioning systems, hybrid systems combining global and local positioning systems, and/or other like positioning and/or location detection systems. However, in various embodiments, geolocation and/or positioning information may come from other sources including an IP address, Wi-Fi and/or Bluetooth MAC address, radio-frequency identification ("RFID"), Wi-Fi connection location, GSM/CDMA cell IDs, and the like.

Mobile terminal 105 may include an accelerometer, gyroscope, gravimeter, and/or another like device that is configured to measure and/or detect a motion, an acceleration, and/or an orientation of the mobile terminal 105. In such embodiments, the mobile terminal 105 may be configured to determine a magnitude and direction of an acceleration and/or motion of the mobile terminal 105, and convert the acceleration and/or motion of the mobile terminal 105 into position and/or orientation information.

Mobile terminal 105 may be configured to run, execute, or otherwise operate one or more applications. The applications may include native applications, web applications, and hybrid applications. The native applications may be used for operating the mobile terminal 105, such as using a camera or other like image sensor of the mobile terminal 105, GPS functionality of the mobile terminal 105, an accelerometer of the mobile terminal 105, cellular phone functionality of the mobile terminal 105, and other like functions of the mobile terminal 105. Native applications may be platform or operating system (OS) specific. Native applications may be developed for a specific platform using platform-specific development tools, programming languages, and the like. Such platform-specific development tools and/or programming languages may be provided by a platform vendor. Native applications may be pre-installed on mobile terminal 105 during manufacturing, or provided to the mobile terminal 105 by an application server (e.g., application server 120) via a network (e.g. network 115).

Web applications are applications that load into a web browser of the mobile terminal 105. The web applications may be websites that are designed or customized to run on a mobile device by taking into account various mobile device parameters, such as resource availability, display size, touchscreen input, and the like. In this way, web applications may provide an experience that is similar to a native application within a web browser. Web applications may be any server-side application that is developed with any server-side development tools and/or programming languages, such as PHP, Node.js, ASP.NET, and/or any other like technology that renders HTML.

Hybrid applications may be a hybrid between native applications and web applications. Hybrid applications may be a standalone, skeletons, or other like application containers that may load a website within the application container. Hybrid applications may be written using website development tools and/or programming languages, such as HTML5, CSS, JavaScript, and the like. Hybrid applications use browser engine of the mobile terminal 105, without using a web browser of the mobile terminal 105, to render a website's services locally. Hybrid applications may also access mobile device capabilities that are not accessible in web applications, such as the accelerometer, camera, local storage, and the like.

In various embodiments, mobile terminal 105 may be configured to measure and/or record network performance parameters, such as network loading information, QoS/QoE parameters, and/or other like characteristics. Network loading information may include a received signal strength indicator (RSSI), received channel power indicator (RCPI), a path loss measurement, packet delay time, and/or other like information that may indicate a level or amount of traffic in a communications network. QoS/QoE parameters may include a call drop rate, a signal to noise ratio, a measure of throughput, a delay, a jitter, latency, a handover success rate, a service response time, a round trip time (RTT) a number of interrupts, an out-of-order delivery of data packets, and/or other like network performance parameters.

In various embodiments, mobile terminal 105 may be configured to measure and record application parameters. Application parameters may include a data buffer fill rate, execution latency and/or other like measurements of time required to complete the execution of a task, response times to application requests and/or tasks, workload performance, throughput, memory and/or other resource utilization levels, application freeze rates, error rates, network connection rates, and/or other like application parameters.

In various embodiments, mobile terminal 105 may be configured to measure and record mobile terminal parameters, such as processor speed and/or processor clock rate, temperature of the mobile terminal 105, a temperature of one or more chips within mobile terminal 105, battery usage, battery temperature, available and/or used memory space, memory fragmentation, and/or any other like mobile terminal parameters. In various embodiments, mobile terminal 105 may be configured to measure and record performance parameters associated with one or more devices that are proximate or attached to mobile terminal 105, such as other computing devices, other mobile terminals, autonomous sensors, Machine Type Communications (MTC) devices, machine to machine (M2M) devices, and the like.

In various embodiments, mobile terminal 105 may be configured to measure and record environmental information, such as a surrounding temperature, surrounding humidity, surrounding weather phenomena, surrounding electromagnetic fields, and/or any other like biotic or abiotic factors surrounding the mobile terminal 105. The environmental information may be measured, obtained, or otherwise determined using an image sensor of the mobile terminal 105, a microphone of the mobile terminal 105, a temperature sensor of the mobile terminal 105, a proximity sensor of the mobile terminal 105, and/or any other like device. Furthermore, the mobile terminal 105 may obtain and/or determine environmental information from a weather forecasting service via network connection. In various embodiments, mobile terminal 105 may be configured to measure and record environmental information that is measured by, or otherwise associated with one or more devices that are proximate to mobile terminal 105, such as other computing devices, other mobile terminals, autonomous sensors, Machine Type Communications (MTC) devices, machine to machine (M2M) devices, and the like.

Base station 110 may be configured to provide wireless communication services to mobile terminals within a geographic area, or cell coverage area, associated with the base station 110. The base station 110 may provide wireless communication services to mobile terminal 105 via a link for user terminal 105. Links between base station 110 and the mobile terminal 105 may include one or more downlink (or forward) channels for transmitting information from base station 110 to mobile terminal 105 and one or more uplink (or reverse) channels for transmitting information from mobile terminal 105 to the base station 110. It should be noted that base station 110 may provide the same or similar wireless communications services to multiple mobile terminals and/or other devices, such as autonomous sensors, MTC devices, M2M devices, and the like.

In various embodiments, base station 110 may include a processor and transmitter/receiver connected to one or more antennas and an electronic switching function. The one or more transmitters/receivers may be configured to transmit/receive data signals to/from one or more mobile terminals within its cell coverage area via one or more links. In various embodiments, base station 110 may be configured to operate a channel access method, such as code division multiple access (CDMA), orthogonal frequency-division multiple access (OFDMA), frequency division multiple access (FDMA), time division multiple access (TDMA), packet mode multiple-access, space division multiple access (SDMA), or other like channel access methods or combination thereof. In various embodiments, base station 110 may employ the E-UTRA protocols (i.e., OFDMA for downlink communications and SC-FDMA for uplink communications) using the LTE interface to connected with, or otherwise communicate with, mobile terminal 105.

In various embodiments, base station 110 may be configured to employ one or more wireless communications standards, such as CDMA, GSM, LTE, WiMAX, or other like wireless communications standard. Base station 110 may also be configured to connect to a service provider's network via hard link, such as a packet switched network, a mobile switching center, or via other like connection means. The electronic switching function may be a "Mobile Switching Center" (MSC) when base station 110 employs a GSM, AMPTS, NMT and CDMA system. Alternatively, a "Media Gateway" (MGW)/"Gateway MSC Server" (GMSC) may be used if base station 110 employs a 3G/4G mobile system. In various embodiments, the aforementioned functions may be provided by separate components or devices.

In various embodiments, where base station 110 uses the LTE wireless communication protocol, base station 110 may comprise components of the System Architecture Evolution (SAE) with an Evolved Packet Core (EPC) as described by the 3rd Generation Partnership Project (3GPP). In such embodiments, base station 110 may include components such as a Mobility Management Entity (MME), Serving Gateway (SGW), PDN Gateway (PGW), Home Subscriber Server (HSS), Access Network Discovery and Selection Function (ANDSF), Evolved Packet Data Gateway (ePDG), and/or other like components as are known. In various embodiments, the aforementioned components may be employed by separate devices.

In various embodiments, base station 110 may be configured to operate a collision detection method, such as a carrier sense multiple access (CSMA) protocol, which is a probabilistic Media Access Control (MAC) protocol in which a device verifies the absence of other traffic before transmitting on a shared transmission medium. The CSMA protocol may employ a collision avoidance (CA) protocol, in which a device only transmits when a channel is sensed to be idle. Alternatively, the CSMA protocol may employ a collision detection (CD) protocol, in which a device terminates a transmission as soon as a collision is detected. However, embodiments are not limited to the collision detection methods described above and may encompass any type of collision detection method. Additionally, the CSMA protocol may be enhanced with a Request-to-Send/Clear-to-Send (RTS/CTS) protocol, in which a device wishing to send data initiates the process by sending a request to send frame (RTS) and the destination device replies with a clear to send frame (CTS).

Network 115 may be any network that allows computers to exchange data. Network 115 may include one or more network elements (not shown) capable of physically or logically connecting computers. In various embodiments, network 115 may be the Internet. In various embodiments, network 115 may be may be a Wide Area Network (WAN) or other like network that covers a broad area, such as a personal area network (PAN), local area network (LAN), campus area network (CAN), metropolitan area network (MAN), a virtual local area network (VLAN), or any other like network capable of physically or logically connecting computers. Additionally, in various embodiments, network 115 may be a private and/or secure network, which is used by a single organization (e.g., a business, a school, a government agency, and the like).

Application server 120 is a network element that may include one or more systems and/or applications for providing one or more services. Application server 120 may include a processor, memory or computer readable storage medium, and a network interface. In some embodiments, application server 120 may include a transmitter/receiver connected to one or more antennas. The application server 120 may be any network element capable of receiving and responding to requests from one or more client devices (e.g., mobile terminal 105) across a computer network (e.g., network 115) to provide one or more services. Accordingly, application server 120 may be configured to communicate with the mobile terminal 105 via a wireless protocol. Additionally, application server 120 may be a single physical hardware device, or application server 120 may be physically or logically connected with other network devices, such that the application server 120 may reside on one or more physical hardware devices.

Application server 120 may employ one or more connection-oriented protocols such as Session Initiation Protocol (SIP), HTTP, and TCP/IP, and includes network devices that use connectionless protocols such as User Datagram Protocol (UDP) and Internet Packet Exchange (IPX). Application server 120 may be configured to establish, manage, and terminate communications sessions, for example between the application server 120 and mobile terminal 105. Application server 120 may also be configured to establish, manage, and terminate communications sessions with two or more client devices.

According to various embodiments, application server 120 may be connected to, or otherwise associated with one or more databases (not shown).

As shown in FIG. 1, only one mobile terminal 105, a single base station 110, and a single application server 120 are present. According to various embodiments, multiple mobile devices, multiple servers, and/or any number of databases (not shown) may be present. Additionally, in some embodiments, application server 120 and/or one or more databases may be virtual machines, and/or they may be provided as part of a cloud computing service. In various embodiments, application server 120 and one or more databases may reside on one physical hardware device, and/or may be otherwise fully integrated with one another.

Figure 2:
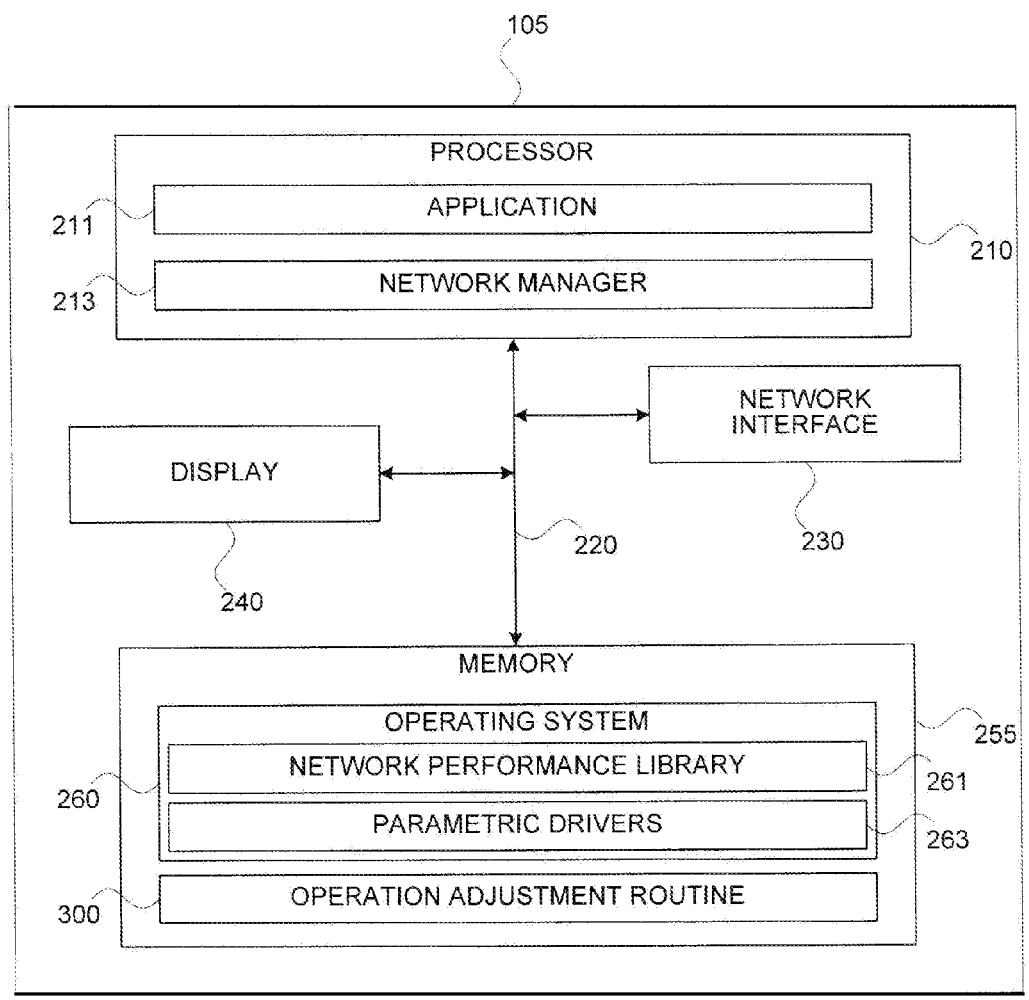
FIG. 2 illustrates the components of a mobile terminal according to an example embodiment.

FIG. 2 illustrates the components of mobile terminal 105 according to an example embodiment. As shown, mobile terminal 105 includes processor 210, bus 220, network interface 230, transmitter 240, receiver 250, and memory 255. In some embodiments, mobile terminal 105 may include many more components than those shown in FIG. 2, such as a display device (e.g., a touchscreen), an input device (e.g., a physical keyboard), one or more image sensors, a transmitter/receiver (or alternatively, a transceiver), a mobile video card and/or graphics processing unit (GPU), and other like components. However, it is not necessary that all of these generally conventional components be shown in order to disclose the example embodiments.

Memory 255 is a hardware device configured to store an operating system 260 and program code for one or more software components, such as operation adjustment routine 300 and/or one or more mobile applications. Memory 255 may be a computer readable storage medium that generally includes a random access memory (RAM), read only memory (ROM), a flash memory device, a solid state disk (SSD), a secure digital (SD) card, and/or other like storage media capable of storing and recording data. The program code and/or software components may also be loaded from a separate computer readable storage medium into memory 255 using a drive mechanism (not shown). Such separate computer readable storage medium may include a memory card, memory stick, removable flash drive, sim card, and/or other like computer readable storage medium (not shown). In some embodiments, software components may be loaded into memory 255 via network interface 230, rather than via a computer readable storage medium.

During operation, memory 255 includes operating system 260. Operating system 260 may include one or more drivers, such as a display driver, camera driver, audio drivers, and/or any other like components that provide an interface to hardware devices thereby enabling operating system 260 and application 211 to access hardware functions without needing to know the details of the hardware itself. Operating system 260 may also include one or more libraries. The libraries may be a collection of resources used by applications to implement system calls. The libraries may include program code or software modules that may be used by multiple applications, including application 211 and network manager 213. During operation, operating system 260 includes network performance library 261 and parametric drivers 263.

The parametric drivers 263 may be program code and/or software components that operate and/or control one or more devices of mobile terminal 105 to measure network performance parameters, application parameters, mobile terminal parameters, environmental information, and/or other like information and/or parameters. The parametric drivers 263 may define how to interface directly with one or more hardware components of mobile terminal 105 by indicating how to read/write data to/from one or more hardware components of mobile terminal 105, or how to operate one or more hardware components of mobile terminal 105.

The network performance library 261 provides program code and/or software components for one or more applications (e.g., application 211 and/or network manager 213) to obtain and use the network performance parameters, application parameters, and/or mobile terminal parameters measured using the parametric drivers 263. In various embodiments, the network performance library 261 includes various software modules and/or software components that may be used to compute, derive, or otherwise determine predicted network performance parameters using the network performance parameters, application parameters, and/or mobile terminal parameters measured using the parametric drivers 263. In various embodiments, network performance library 261 may be implemented as an application programming interface (API). The API may allow mobile application developers to use desired ones of the various software modules and/or software components of the network performance library 261 such that their mobile applications may interact with the parametric drivers 263.

Processor 210 may be configured to carry out instructions of a computer program by performing the basic arithmetical, logical, and input/output operations of the system. The processor 210 may include a single-core processor, a dual-core processor, a triple-core processor, a quad-core processor, etc. The processor 210 may perform a variety of functions for the mobile terminal 105 and may process data by executing program code, one or more software modules, firmware, middleware, microcode, hardware description languages, and/or any other like set of instructions stored in the memory 255. The program code may be provided to processor 210 by memory 255 via bus 220, one or more drive mechanisms (not shown), and/or via network interface 230. In order to perform the variety of functions and data processing operations, the program code and/or software components are loaded into the processor 210. Once the program code is loaded into the processor 210, the processor 210 may be programmed to perform the various operations and functions delineated by the program code, thereby transforming the processor 210 into a special purpose processor.

For example, the application 211 and/or the network manager 213 may be loaded into the processor 210. Once the application 211 and/or the network manager 213 are loaded into the processor 210, the processor 210 may be configured to perform mode of operation adjustments and/or other like mobile terminal adjustments according to various example embodiments. In various embodiments, the mode of operation adjustments may be based on one or more application parameters of the application 211, which is loaded into the processor 210.

Network manager 213 is an application that utilizes the network performance library 261 in order to simulate or otherwise generate a "virtual local network". The virtual local network may include predicted network performance parameters based on the network performance parameters, application parameters, mobile terminal parameters, and/or environmental information measured using the parametric drivers 263. The application 211 may use the virtual local network as a basis for adjusting a mode of operation of the mobile terminal 105. By using the predicted network performance parameters from the virtual local network, the mobile terminal 105 may adjust a mode of operation without requesting current network performance parameters, current network condition information, and the like as measured by a network entity (e.g. base station 110).

The application 211 may be a native application, a web application, or a hybrid application. In various embodiments, a developer associated with the application 211 may alter or otherwise modify the application 211 to utilize the virtual local network to adjust application modes of operation and/or mobile terminal modes of operation in order to increase QoS/QoE of the application 211 and/or enable a more efficient use of computing and/or network resources.

Bus 220 enables the communication and data transfer between the components of mobile terminal 105. Bus 220 may comprise a high-speed serial bus, parallel bus, internal universal serial bus (USB), Front-Side-Bus (FSB), and/or other suitable communication technology for transferring data between components within mobile terminal 105 and/or between mobile terminal 105 and other like devices.

Network interface 230 is a computer hardware component that connects mobile terminal 105 to a computer network (e.g., network 115). Network interface 230 may connect mobile terminal 105 to a computer network via a wired or wireless connection. Network interface 230 may operate in conjunction with a wireless transmitter/receiver and/or transceiver (not shown) that is configured to operate in accordance with one or more wireless standards. The network interface 230 may also include one or more virtual network interfaces configured to operate with application 211 and/or other like mobile applications.

As discussed above, mobile terminal 105 may also include a transmitter and receiver or a transceiver (not shown). The transmitter may be any type of hardware device that generates or otherwise produces radio waves in order to communicate with one or more other devices. The transmitter may be coupled with an antenna (not shown) in order to transmit data to one or more other devices. The transmitter may be configured to receive digital data from one or more components of mobile terminal 105 via bus 220, and convert the received digital data into an analog signal for transmission over an air interface. The receiver may be any type of hardware device that can receive and convert a signal from a modulated radio wave into usable information, such as digital data. The receiver may be coupled with the antenna (not shown) in order to capture radio waves. The receiver may be configured to send digital data converted from a captured radio wave to one or more other components of mobile terminal 105 via bus 220. In embodiments where a transceiver (not shown) is included with mobile terminal 105, the transceiver may be a single component configured to provide the functionality of a transmitter and a receiver as discussed above.

Figure 3:
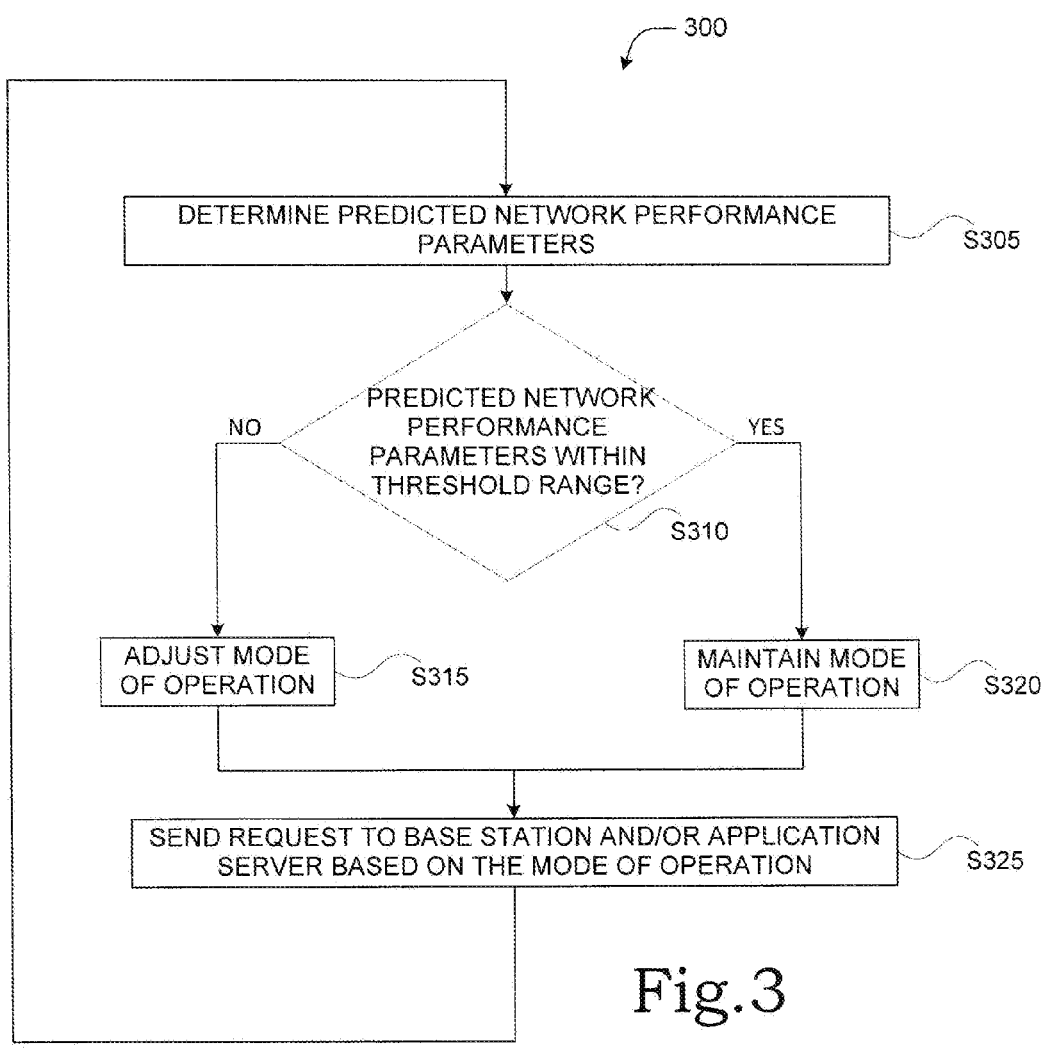
FIG. 3 shows a operation adjustment routine according to an example embodiment.

FIG. 3 shows an operation adjustment routine 300 according to an example embodiment. For illustrative purposes, the operations of operation adjustment routine 300 will be described as being performed by mobile terminal 105 as shown in FIG. 1. However, it should be noted that any other like computing device that is the same or similar to mobile device 105 may perform operation adjustment routine 300 as described below.

As shown in operation S305, mobile terminal 105 determines predicted network performance parameters. Mobile terminal 105 may be configured to measure network performance parameters, application parameters, mobile terminal parameters, and/or environmental information by way of the parametric drivers 263. The mobile terminal 105 may then use the measured network performance parameters, application parameters, and/or mobile terminal parameters to compute, derive, or otherwise determine predicted network performance parameters. In various embodiments, the predicted network performance parameters may be used to generate a virtual local network. By using the predicted network performance parameters from the virtual local network, the mobile terminal 105 may determine the predicted network performance parameters without requesting current network performance parameters, current network condition information, and the like as measured by a network entity (e.g. base station 110).

Referring to operation S305, according to example embodiments, determining the predicted network performance parameters may include determining current network conditions. The current network conditions may be based on the measured network performance parameters, application parameters, mobile terminal parameters, and/or environmental information measured by the mobile terminal 105. The mobile terminal 105 may also obtain the measured network performance parameters, application parameters, mobile terminal parameters, and/or environmental information from one or more other devices that are proximate to the mobile terminal 105. The one or more other devices may include other mobile terminals, M2M devices, automated sensors, and the like.

In various embodiments, the measured network performance parameters may include network loading information, QoS/QoE parameters, and/or other like characteristics. Furthermore, in various embodiments, the environmental information may be based on environmental factors surrounding the mobile terminal 105. Such environmental factors may include a surrounding temperature, surrounding humidity, surrounding weather phenomena, surrounding electromagnetic fields, and/or any other like biotic or abiotic factors surrounding the mobile terminal 105.

Referring back to operation S305, once the current network conditions are determined, the mobile terminal 105 may determine the predicted network performance parameters. In various embodiments, the predicted network performance parameters may be calculated or otherwise determined based on a rolling average of the measured/current network performance parameters, the application parameters, the mobile terminal parameters, and/or the environmental information. The rolling average may indicate an average value of the measured/current network performance parameters, the application parameters, the mobile terminal parameters, and/or the environmental information that are measured during a desired time interval and/or time period.

In various embodiments, the predicted network performance parameters may be based on historical parameters associated with the measured/current network performance parameters, the application parameters, the mobile terminal parameters, and/or the environmental information. Historical parameters may include a mode of operation and/or a functionality that the mobile terminal 105 and/or the application 211 experienced during same or similar network performance parameters, application parameters, mobile terminal parameters, and/or environmental factors. In various embodiments, the mobile terminal 105 may record and store a current mode of operation in association with the measured/current network performance parameters, the application parameters, the mobile terminal parameters, and/or the environmental information to be used as historical parameters for future predictions of network performance parameters.

It should be noted that historical parameters may also be associated with predicted network performance parameters, predicted application parameters, predicted mobile terminal parameters, and/or predicted environmental information. Therefore, in various embodiments, the historical parameters associated with the predicted network performance parameters, the predicted application parameters, the predicted mobile terminal parameters, and/or the predicted environmental information may be used to adjust a mode of operation of the mobile terminal 105.

Referring back to operation S305, according to example embodiments, determining the predicted network performance parameters may include determining desired application parameters of the application 211. A desired application parameter may be any feature, characteristic, or other like measurable factor that the application 211 uses to ensure a minimum level of functionality and/or a desired QoS/QoE. In various embodiments, the application 211 may define the desired application parameters. In some embodiments, the mobile terminal 105 may determine the desired application parameters based on an application type of the application 211.

In various embodiments, the mobile terminal 105 may monitor current application parameters of the application 211 and compare the desired application parameters with the current application parameters. A current application parameter may be any feature, characteristic, or other like measurable factor that the application 211 is experiences during an execution of the application 211. In various embodiments, the predicted network performance parameters may be based on the difference between the desired application parameters with the current application parameters.

Referring back to operation S305, according to example embodiments, determining the predicted network performance parameters may be based on an event that occurs on the mobile terminal 105. In such embodiments, the mobile terminal 105 may establish a trigger mechanism. A trigger mechanism may be any type of program code and/or process that automatically executes in response to an event. In various embodiments, the trigger mechanism may be based on the application 211. Typically, triggers may include events such as sensor inputs/outputs, timer values, user actions, messages from other applications and/or devices (i.e., paging), and/or the like. Thus, in various embodiments, mobile terminal 105 may establish a trigger mechanism that corresponds to one or more trigger events. When the mobile terminal 105 detects that a trigger event has occurred, a trigger mechanism may be triggered and the mobile terminal 105 will predict future network performance parameters accordingly. In various embodiments, the predicted network performance parameters may be based on historical parameters associated with one or more events. The historical parameters associated with the one or more events may include a mode of operation and/or a functionality that the mobile terminal 105 and/or the application 211 experienced during and/or after a same or similar event(s). In various embodiments, the mobile terminal 105 may record and store a current mode of operation in association with one or more events to be used as historical parameters for future predictions of network performance parameters.

Referring back to operation S305, according to example embodiments, determining the predicted network performance parameters may be based on detecting a position, an orientation, a movement direct, movement velocity, and/or a movement acceleration of the mobile terminal 105 using GPS circuitry, accelerometer, gyroscope, gravimeter, and/or another like devices of the mobile terminal 105. In various embodiments, the mobile terminal 105 may predict future network performance parameters based on a current position and/or orientation of the mobile terminal 105. Furthermore, the mobile terminal 105, using the aforementioned devices, may determine a current movement direction, velocity, and/or acceleration, which may also be used to predict future network performance parameters. In various embodiments, the predicted network performance parameters may be based on historical parameters associated with the current position and/or orientation, movement direction, velocity, and/or acceleration. The historical parameters associated with the current position and/or orientation, movement direction, velocity, and/or acceleration may include a mode of operation and/or a functionality that the mobile terminal 105 and/or the application 211 experienced in a position and/or orientation, movement direction, velocity, and/or acceleration that is the same or similar to the current position and/or orientation, movement direction, velocity, and/or acceleration. In various embodiments, the mobile terminal 105 may record and store a current mode of operation in association with current position and/or orientation, movement direction, velocity, and/or acceleration to be used as historical parameters for future predictions of network performance parameters.

As shown in operation S310, mobile terminal 105 determines whether the predicted network performance parameters are within a desired threshold range. If the mobile terminal 105 determines that the predicted network performance parameters are within the desired threshold range, the mobile terminal proceeds to operation S320 to maintain a mode of operation of the mobile terminal 105. If the mobile terminal 105 determines that the predicted network performance parameters are not within the desired threshold range, the mobile terminal proceeds to operation S315 to adjust the mode of operation of the mobile terminal 105.

A mode of operation may include one or more functions or settings of the mobile terminal 105. For example, a mode of operation may include settings and functions such as audio settings and functions, display settings and functions, vibration settings and functions, input/output settings and functions, application settings and functions, security settings and functions, network access settings and functions, data storage settings and functions, and/or any other like settings and/or functions associated with mobile terminal 105. Adjusting the mode of operation may include configuring, changing, altering, varying, enabling, disabling, or otherwise modifying one or more of the aforementioned settings and functions of mobile terminal 105. Furthermore, a mode of operation may include modifying a combination of the aforementioned functions and settings, which according to various embodiments, may be performed in a desired order.

The desired threshold range may be any reference value or set of reference values that may be used to determine if a mode of operation should be adjusted. In various embodiments, the desired threshold range may be a minimum or maximum value that once exceeded or passed, triggers the mobile terminal 105 to adjust the mode of operation. Therefore, the mobile terminal 105 may be configured to determine if the predicted network performance parameters are equal to a desired threshold, or if the predicted network performance parameters within the desired threshold range, in order to maintain (or not adjust) a mode of operation. Additionally, the mobile terminal 105 may be configured to determine if the predicted network performance parameters are not equal to a desired threshold, or if the predicted network performance parameters outside of the desired threshold range, in order to adjust a mode of operation. The desired threshold or desired threshold range may be based on one or more design choices and/or determined based on empirical studies. In various embodiments, the desired threshold or desired threshold range may be based on historical parameters associated with current network conditions, current application parameters, mobile terminal parameters, environmental information, and/or predicted network performance parameters.

As shown in operation S325, after adjusting the mode of operation or after maintaining the mode of operation, the mobile terminal 105 sends a request to the application server 120 based on the adjusted or maintained mode of operation. After the request has been sent to the application server 120, mobile terminal 105 proceeds back to operation S305 to determine predicted network performance parameters.

It should be noted that in various embodiments, operation S325 may be an optional included in the operation adjustment routine 300. For example, depending on the mode of operation and/or the application 211, the mobile terminal 105 may not have to, or be able to send a request to the application server 120. In such embodiments, the mobile terminal 105 may proceed back to operation S305 to determine predicted network performance parameters after (i) the mode of operation is adjusted at operation S315, or (ii) the mode of operation is maintained at operation S320.

Non-limiting example embodiments of the operation adjustment routine 300 are as follows.

According to a first non-limiting example embodiment, the application 211 is a video streaming application, and operation adjustment routine 300 may operate as follows.

As shown at operation S305, the mobile terminal 105 determines predicted network performance parameters. In various embodiments, the mobile terminal 105 may determine current network conditions, current application parameters, mobile terminal parameters, and/or environmental information. According to the first non-limiting example embodiment, the current application parameters may include a buffer capacity of a video buffer, a space availability of the video buffer, and/or a buffer fill rate of the video buffer. The video buffer may be used for playback of the streaming video data to provide a desired QoE/QoS when an encoding rate decreases. Additionally, the current network conditions may be based on a rolling average of one or more current network performance parameters. Furthermore, according to the first non-limiting example embodiment, the mobile terminal 105 may determine that a desired application parameter of the video streaming application includes a desired encoding rate or bitrate.

As shown in operation S310, mobile terminal 105 determines whether the predicted network performance parameters are within a desired threshold range. According to the first non-limiting example embodiment, the mobile terminal 105 may determine that, based on a rolling average of one or more current network performance parameters and/or one or more environmental factors, the current network conditions are decreasing by a rate of change. The decreasing rate of change may indicate that the future network conditions will likely be unfavorable for the video streaming application. The mobile terminal 105 may then use the decreasing rate of change to calculate predicted network performance parameters, such as a predicted signal strength, a predicted available bandwidth, and the like.

If at operation S310 the mobile terminal 105 determines that the predicted network performance parameters are not within a desired threshold range, the mobile terminal proceeds to operation S315 to adjust the mode of operation of the mobile terminal 105. The desired threshold range may be a range of desired encoding rates that are determined based on a desired encoding rate defined by the video streaming application. If the predicted network performance parameters indicate that the encoding rate will likely fall below the desired encoding rate and/or that the encoding rate will likely fall outside of the desired range of encoding rates, the mobile terminal 105 may increase the encoding rate such that the video buffer will be filled at or near a maximum capacity prior to the mobile terminal 105 experiencing the degraded network conditions. Additionally, in order to fill the video buffer, the mobile terminal 105 may increase the buffer fill rate. As shown at operation S325, the mobile terminal 105 sends a request to the base station 110 and/or the application server 120 according to the increased encoding rate. Then the mobile terminal 105 proceeds back to operation S305 to determine the predicted network performance parameters.

Additionally or alternatively, in various embodiments, if at operation S310 the predicted network performance parameters indicate that the encoding rate will likely to such an extent that the streaming application will likely be unable to provide a desired QoS/QoE, at operation S315 the mobile terminal 105 may adjust a mode of operation from a streaming mode to a download mode. In such embodiments, at operation S325 the mobile terminal 105 may send a request to the base station 110 and/or the application server 120 in order to download an entire video file, or a portion of the video file, so that the mobile terminal 105 may store the video file in a local storage device. In this way, the mobile terminal 105 may playback the video file from the local storage device prior to the mobile terminal experiencing the degraded network conditions.

It should be noted that according to the first non-limiting example embodiment, if at operation S305 the mobile terminal 105 predicts that more favorable network conditions will occur and/or the video buffer reaches a desired capacity, the mobile terminal 105 may decrease the encoding rate in order to conserve network resources for the communications network 100 and/or conserve computational resources of the mobile terminal 105.

Referring back to FIG. 3, if at operation S310 the mobile terminal 105 determines that the predicted network performance parameters are within the desired threshold range (e.g., at or near the desired encoding rate), the mobile terminal proceeds to operation S320 to maintain the mode of operation (e.g., the encoding rate) of the mobile terminal 105. As shown at operation S325, the mobile terminal 105 sends a request to the base station 110 and/or the application server 120 according to a current encoding rate. Then the mobile terminal 105 proceeds back to operation S305 to determine the predicted network performance parameters.

According to a second non-limiting example embodiment, the application 211 is a turn-by-turn navigation application, and operation adjustment routine 300 may operate as follows.

As shown at operation S305, the mobile terminal 105 determines predicted network performance parameters. As noted previously, the mobile terminal 105 may determine current network conditions, current application parameters, mobile terminal parameters, and/or environmental information. According to the second non-limiting example embodiment, the current mobile terminal parameters may include (i) a current position, a current orientation, and/or a current movement velocity of the mobile terminal 105, and/or (ii) an antenna gain of the mobile terminal 105. The current network conditions may be based on historical parameters associated with various geolocations (current geolocation and/or predicted geolocations that the mobile terminal 105 may travel to) and a signal strength of a GPS signal. Additionally, the mobile terminal 105 may determine that a desired application parameter of the turn-by-turn navigation application includes a desired GPS signal strength.

As shown in operation S310, mobile terminal 105 determines whether the predicted network performance parameters are within a desired threshold range. By way of example, the mobile terminal 105 may determine, using GPS circuitry and/or an accelerometer of the mobile terminal 105, that the mobile terminal 105 is approaching a geographic feature and/or landmark at a certain movement velocity. Based on one or more historical parameters associated with the geographic feature and/or landmark, the mobile terminal 105 may determine that the future network conditions will deteriorate as the mobile terminal 105 becomes more proximate to the geographic feature and/or landmark. The mobile terminal 105 may then use the one or more historical parameters associated with the geographic feature and/or landmark to calculate predicted network performance parameters, such as a predicted GPS signal strength and the like.

If at operation S310 the mobile terminal 105 determines that the predicted network performance parameters are not within a desired threshold range, the mobile terminal proceeds to operation S315 to adjust the mode of operation of the mobile terminal 105. According to the second non-limiting example embodiment, the desired threshold range may be a range of desired GPS signal magnitudes that are determined based on the desired GPS signal strength. If the predicted network performance parameters indicate that the GPS signal strength will fall below the desired the GPS signal strength and/or the range of desired signal strengths, the mobile terminal 105 may increase the antenna gain of the mobile terminal 105 such that the GPS signal will be received or otherwise acquired at or near the desired GPS signal strength prior to the mobile terminal 105 becoming more proximate to the geographic feature and/or landmark.

According to the second non-limiting example embodiment, the turn-by-turn navigation application may not require requests to be sent/received to/from the base station 110 and/or the application server 120. Thus, once the mobile terminal adjusts the mode of operation (e.g., the antenna gain), the mobile terminal 105 proceeds back to operation S305 to determine the predicted network performance parameters. However, in embodiments where the turn-by-turn navigation application does require requests to be sent/received to/from the base station 110 and/or the application server 120, at operation S325, the mobile terminal 105 may send a request to the base station 110 and/or the application server 120 according to the adjusted mode of operation.

It should be noted that according to the second non-limiting example embodiment, as the mobile terminal 105 becomes less proximate to the geographic feature and/or landmark, the mobile terminal 105 may determine that the predicted future network conditions will likely become more favorable. Thus, as the mobile terminal 105 becomes less proximate to the geographic feature and/or landmark, the mobile terminal 105 may decrease the antenna gain in order to conserve network resources for the communications network 100 and/or conserve computational resources of the mobile terminal 105.

According to a third non-limiting example embodiment, the application 211 is a music streaming application, and operation adjustment routine 300 may operate as follows.

As shown at operation S305, the mobile terminal 105 determines predicted network performance parameters. As noted previously, the mobile terminal 105 may determine current network conditions, current application parameters, mobile terminal parameters, and/or environmental information. According to the third non-limiting example, the current application parameters may include a buffer capacity of a music buffer, a space availability of the music buffer, and a buffer fill rate of the music buffer. The music buffer may be used for playback of the streaming audio data to provide a desired QoE when an encoding rate decreases. The mobile terminal parameters may be based at least on (i) a position of the mobile terminal 105, an orientation of the mobile terminal 105, a movement velocity of the mobile terminal 105, and/or a movement acceleration of the mobile terminal 105; and/or (ii) one or more peripheral devices connected to the mobile terminal 105. Furthermore, the mobile terminal 105 may determine that a desired application parameter of the music streaming application includes a desired encoding rate or bitrate.

Referring to FIG. 3, in operations S310, S315, S320, and S325, the mobile terminal 105 may increase or decrease the encoding rate and/or the buffer fill rate based on the predicted network performance parameters in a same or similar fashion as discussed previously with regard to the first non-limiting example.

Additionally or alternatively, in operation S310, the mobile terminal 105 may determine, using for example the GPS circuitry of the mobile terminal 105, that a movement velocity of the mobile terminal 105 and/or a movement acceleration of the mobile terminal 105 is increasing by a rate of change. Furthermore, the mobile terminal 105 may use the GPS circuitry to determine a movement direction of the mobile terminal 105. Additionally and/or alternatively, in operation S310, the mobile terminal 105 may determine environmental information surrounding the mobile terminal 105.

The mobile terminal 105 may then use the movement direction and/or the increasing rate of change of the mobile terminal 105 to calculate predicted network performance parameters, such as a predicted signal strength, a predicted available bandwidth, and the like. By way of example, the mobile terminal 105 may determine, using the GPS circuitry, that the mobile terminal 105 is approaching a region at a certain movement velocity and/or movement acceleration. Based on one or more historical parameters associated with the region, the mobile terminal 105 may determine that the future network conditions may not deteriorate as the mobile terminal 105 becomes more proximate to the region. However, based on one or more environmental factors measured by the mobile terminal 105, the mobile terminal 105 may determine that the future network conditions will likely deteriorate due to inclement weather approaching the region. The mobile terminal 105 may then use the one or more historical parameters associated with the region and the one or more measured environmental factors to calculate predicted network performance parameters, such as the predicted signal strength and the like.

According to a fourth non-limiting example embodiment, the application 211 is a time management application, and operation adjustment routine 300 may operate as follows.

As shown at operation S305, the mobile terminal 105 determines predicted network performance parameters. As noted previously, the mobile terminal 105 may determine current network conditions, current application parameters, and mobile terminal parameters. According to the fourth non-limiting example embodiment, the current application parameters may include calendar information and/or scheduling information that may be entered into the time management application by a user of the mobile terminal 105. In some embodiments, the time management application may interact with one or more other applications of the mobile terminal 105 (e.g., an email native application and the like) to obtain the calendar information and/or the scheduling information. For the fourth non-limiting example embodiment, it is assumed that the time management application determines that a user of the mobile terminal 105 is scheduled to fly from a first airport at a first time and date and arrive at a second airport at a second time and date. Additionally, the mobile terminal parameters may be based at least on a geolocation and/or position of the mobile terminal 105.

As shown in operation S310, mobile terminal 105 determines whether the predicted network performance parameters are within a desired threshold range. By way of example, the mobile terminal 105 may determine that the predicted network performance parameters will be substantially non-existent during a time period lasting from the first time and date to the second time and date. According to various embodiments, the mobile terminal 105 may establish a first event trigger based on (i) the first time and date and/or (ii) a geolocation associated with the first airport. Additionally, the mobile terminal 105 may establish a second event trigger based on (i) the second time and date and/or (ii) a geolocation associated with the second airport.

When the mobile terminal 105 detects that the first event has occurred (e.g., the mobile terminal becomes proximate to the geolocation associated with the first airport at or around the first time and date), a first event trigger may be triggered and the mobile terminal 105 may determine that the predicted network performance parameters will be substantially non-existent. Once the first event trigger is triggered, the mobile terminal 105 may calculate the predicted network performance parameters to be at or near zero.

As noted above, if at operation S310 the mobile terminal 105 determines that the predicted network performance parameters are not within the desired threshold range, the mobile terminal proceeds to operation S315 to adjust the mode of operation of the mobile terminal 105. According to the fourth non-limiting example embodiment, the mode of operation may be placing the mobile terminal 105 in "airplane mode", a "sleep mode", or shutting the mobile terminal 105 off. The airplane mode or sleep mode may is a setting available the mobile terminal 105, which when activated, suspends one or more signal transmitting functions while still permitting use of other non-signaling functions (e.g., video playback, audio playback, image sensor functionality, and the like).

According to the fourth non-limiting example embodiment, the desired threshold range may be a range of desired wireless network signal magnitudes that are determined based on a desired wireless signal strength. If the predicted network performance parameters indicate that the wireless network signal strength will fall below the desired wireless network signal strength, the mobile terminal 105 may place the mobile terminal 105 in airplane mode prior to the mobile terminal 105 experiencing the degraded wireless signal strength.

According to the fourth non-limiting example embodiment, the time management application may not require requests to be sent/received to/from the base station 110 and/or the application server 120. Thus, once the mobile terminal adjusts the mode of operation (e.g., setting the mobile terminal 105 to the airplane mode), the mobile terminal 105 proceeds back to operation S305 to determine the predicted network performance parameters.

According to the fourth non-limiting example embodiment, the mobile terminal 105 may detect that the second trigger event has occurred (e.g., the mobile terminal becomes proximate to the geolocation associated with the second airport at or around the second time and date). In such embodiments, because the mobile terminal 105 is in airplane mode, the mobile terminal 105 may use non-signaling based functionality to determine that the second event has occurred. For example, the second event may be determined to have occurred based on a current time and date and/or environmental factors measured by at least one component of the mobile terminal 105. When the mobile terminal 105 detects that the second event has occurred, a second event trigger may be triggered, and the mobile terminal 105 may then adjust the mode of operation of the mobile terminal 105 such that the mobile terminal 105 is placed in a normal operating mode. Once the mobile terminal 105 is placed in the normal operating mode, the mobile terminal 105 may calculate predicted network performance parameters according to the aforementioned example embodiments.

According to a fifth non-limiting example embodiment, the application 211 is a text messaging application, and operation adjustment routine 300 may operate as follows.

As shown at operation S305, the mobile terminal 105 determines predicted network performance parameters. As noted previously, the mobile terminal 105 may determine current network conditions, current application parameters, and mobile terminal parameters. According to the fifth non-limiting example embodiment, the current application parameters may include contact information, such as phone numbers, email addresses, and/or other like contact information associated with one or more persons know to a user of the mobile terminal 105. The contact information that may be entered into or otherwise obtained by text messaging application by a user of the mobile terminal 105. In some embodiments, the text messaging application may interact with one or more other applications of the mobile terminal 105 (e.g., an email application, a time management application, an address book application, and the like) to obtain the contact information.

For the fifth non-limiting example embodiment, it is assumed that the text messaging application determines that a user of the mobile terminal 105 is operating a motor vehicle. In various embodiments, the mobile terminal 105 may use a gyroscope and/or accelerometer to determine movement factors, such as a position change of the mobile terminal 105, an orientation change of the mobile terminal 105, and/or a movement velocity of the mobile terminal 105. Additionally, the mobile terminal 105 may use an image sensor, a microphone, and/or one or more biometric sensors to determine, biometric factors such as an eye movement of a user of the mobile terminal 105, a heart rate of the user of the mobile terminal 105, a body temperature of the user of the mobile terminal 105, and/or other like biometric data. The mobile terminal 105 may use one or more of the aforementioned movement factors and/or biometric factors to determine that the user of the mobile terminal 105 is operating a motor vehicle.

As shown in operation S310, mobile terminal 105 determines whether the predicted network performance parameters are within a desired threshold range. By way of example, the mobile terminal 105 may determine that the predicted network performance parameters indicate that future network conditions may likely be relatively favorable. However, according to various embodiments, a virtual local network generated by the mobile terminal 105 may indicate that the network conditions are not favorable for operating a text messaging application based on the determination that the user of the mobile terminal 105 is operating a motor vehicle. Therefore, according to the fifth non-limiting example embodiment, when the mobile terminal 105 detects that the user of the mobile terminal 105 is operating a motor vehicle, the mobile terminal 105 may determine that the predicted network performance parameters will be substantially non-existent for text messaging applications. In various embodiments, even though the mobile terminal 105 may determine that the predicted network performance parameters will be substantially non-existent for text messaging applications, the mobile terminal 105 may determine that the predicted network performance parameters may be favorable for other applications running on the mobile terminal 105.

As noted above, if at operation S310 the mobile terminal 105 determines that the predicted network performance parameters are not within the desired threshold range, the mobile terminal proceeds to operation S315 to adjust the mode of operation of the mobile terminal 105. According to the fifth non-limiting example embodiment, the mode of operation may be placing the mobile terminal 105 in a "sleep mode", disabling a text messaging functionality, and/or any other means of reducing an ability of the user of the mobile terminal from using the text messaging application.

According to the fifth non-limiting example embodiment, the desired threshold range may be a range of desired movement velocity magnitudes that are determined based on a current movement velocity and/or a predicted movement velocities. Additionally, the desired threshold range may be a range of eye movement rates of change. Furthermore, the desired threshold range may be a range of mobile device orientation change rates. If the predicted network performance parameters indicate that (i) the movement velocity of the mobile terminal 105 will rise above the desired movement velocity magnitude, (ii) that the eye movement rate of change will rise above the desired eye movement rate of change, and/or (iii) that the mobile terminal 105 orientation rate of change will rise above the desired mobile device orientation rate, the mobile terminal 105 may disable to text messaging functionality of the mobile terminal 105 while the user of the mobile terminal 105 is operating the motor vehicle.

According to the fifth non-limiting example embodiment, the text messaging application may not require requests to be sent/received to/from the base station 110 and/or the application server 120. Thus, once the mobile terminal adjusts the mode of operation (e.g., disabling to text messaging functionality), the mobile terminal 105 proceeds back to operation S305 to determine the predicted network performance parameters.

According to the fifth non-limiting example embodiment, after a period of time, the mobile terminal 105 may detect that the user of the mobile terminal 105 has stopped operating the motor vehicle. In such embodiments, when the mobile terminal 105 detects that the user of the mobile terminal 105 has stopped operating the motor vehicle, the mobile terminal 105 may then adjust the mode of operation to enable the text messaging functionality of the mobile terminal 105. Once the mobile terminal 105 is enables the text messaging functionality, the mobile terminal 105 may calculate predicted network performance parameters according to the aforementioned example embodiments.

As will be appreciated, the systems and methods according to the example embodiments provide several advantages. First, the example embodiments allows for a mobile terminal to generate its own virtual local network based on network performance parameters, application parameters, mobile terminal parameters, and/or environmental information, which may then be used for a more efficient allocation of network resources and a reduction in overhead. Second, the example embodiments allow for easy implementation because the methods and systems as discussed above may be used by already-established mobile terminals and/or network elements. Third, the example embodiments may allow application developers to optimize a QoS/QoE of their applications without requiring knowledge of wireless network topology and/or configuration of network elements.

The invention being thus described, it will be obvious that the same may be varied in many ways. Such variations are not to be regarded as a departure from the invention, and all such modifications are intended to be included within the scope of the present invention.

We claim:

1. A method for adjusting at least one mode of operation of a mobile terminal based on predicted network performance parameters, the method comprising:

generating, by the mobile terminal, a simulation of a local network, the simulation simulating network conditions surrounding the mobile terminal based on at least one of (i) a mobile terminal parameter and (ii) environmental information, the at least one of the mobile terminal parameter and the environmental information being measured by the mobile terminal or obtained by the mobile terminal the simulated network conditions being determined without requesting network performance information from a network element;

determining, by the mobile terminal, predicted network performance parameters based on the simulation; and adjusting, by the mobile terminal, the at least one mode of operation based on the predicted network performance parameters.

2. The method of claim 1, wherein the generating comprises:
    determining current network conditions based on the environmental information.
3. The method of claim 1, wherein the generating comprises:
    determining current network conditions based on environmental information of another device, the other device being at least one of proximate to the mobile terminal and attached to the mobile terminal, the environmental information of the other device being one of measured by the mobile terminal and obtained by the mobile terminal.
4. The method of claim 1, wherein,
    the generating includes,
        determining desired application parameters of an application that is executed by the mobile terminal, the desired application parameters being defined by the application, and
        monitoring current application parameters of the application; and
    the adjusting includes adjusting the at least one mode of operation of the mobile terminal according to a difference between the desired application parameters and the current application parameters.
5. The method of claim 4, wherein the determining the desired application parameters includes determining historical parameters associated with the application.
6. The method of claim 1, wherein,
    the generating includes,
        determining that an event has occurred on the mobile terminal,
        determining historical parameters associated with the event; and
    the adjusting includes adjusting the at least one mode of operation of the mobile terminal based on the historical parameters associated with the event.
7. The method of claim 1, wherein,
    the generating includes,
        determining a current position of the mobile terminal,
        determining historical parameters associated with the current position; and
    the adjusting includes adjusting the at least one mode of operation of the mobile terminal based on the historical parameters associated with the current position.
8. The method of claim 7, wherein,
    the generating includes,
        determining at least one of a movement velocity of the mobile terminal, a movement acceleration of the mobile terminal, and an orientation of the mobile terminal,
        determining at least one of a predicted position, a predicted orientation, a predicted movement velocity, and a predicted acceleration based on at least one of (i) the current position and (ii) the at least one of the movement velocity, the movement acceleration, and the orientation, and
        determining at least one of (i) historical parameters associated with the predicted position and (ii) historical parameters associated with the at least one of the predicted movement velocity, the predicted movement acceleration, and the predicted orientation; and
    the adjusting includes adjusting the at least one mode of operation of the mobile terminal based on at least one of (i) the current position, (ii) historical parameters associated with the predicted position, and (iii) the historical parameters associated with the at least one of the predicted movement velocity, the predicted movement acceleration, and the predicted orientation.
9. The method of claim 1, wherein the generating comprises:
    measuring environmental factors surrounding the mobile terminal; and
    determining current network performance parameters based on the measured environmental factors.
10. The method of claim 9, wherein the generating further comprises:
    determining a rolling average for the current network performance parameters, the rolling average indicating an average value of the current network performance parameters that are measured during a desired time interval.
11. A mobile terminal comprising:
    a processor configured to,
        generate a simulation of a local network, the simulation simulating network conditions surrounding the mobile terminal based on at least one of (i) a mobile terminal parameter and (ii) environmental information, the at least one of the mobile terminal parameter and the environmental information being measured by the mobile terminal or obtained by the mobile terminal, the simulated network conditions being determined without requesting network performance information from a network element,
        determine predicted network performance Parameters based on the simulation, and
        adjust at least one mode of operation based on the predicted network performance parameters.
12. The mobile terminal of claim 11, wherein, in the generating, the processor is further configured to:
    determine current network conditions based on the environmental information.
13. The mobile terminal of claim 11, wherein, in the generating, the processor is further configured to:
    determine current network conditions based on environmental information of another device, the other device being at least one of proximate to the mobile terminal and attached to the mobile terminal, the environmental information of the other device being one of measured by the mobile terminal and obtained by the mobile terminal.
14. The mobile terminal of claim 11, wherein,
    in the generating, the processor is further configured to,
        determine desired application parameters of an application that is executed by the mobile terminal, the desired application parameters being defined by the application, and
        monitor current application parameters of the application; and
    in the adjusting, the processor is further configured to adjust the at least one mode of operation of the mobile terminal according to a difference between the desired application parameters and the current application parameters.
15. The mobile terminal of claim 14, wherein, in the determining the desired application parameters, the processor is further configured to determine historical parameters associated with the application.
16. The mobile terminal of claim 11, wherein,
    in the generating, the processor is further configured to,
        determine that an event has occurred on the mobile terminal,
        determine historical parameters associated with the event; and in the adjusting, the processor is further configured to adjust the at least one mode of operation of the mobile terminal based on the historical parameters associated with the event.

17. The mobile terminal of claim 11, wherein,
in the generating, the processor is further configured to,
determine a current position of the mobile terminal,
determine historical parameters associated with the current position; and
in the adjusting, the processor is further configured to adjust the at least one mode of operation of the mobile terminal based on the current position.

18. The mobile terminal of claim 17, wherein,
in the generating, the processor is further configured to,
determine at least one of a movement velocity of the mobile terminal, a movement acceleration of the mobile terminal, and an orientation of the mobile terminal,
determine at least one of a predicted position, a predicted orientation, a predicted movement velocity, and a predicted acceleration based on (i) the current position and (ii) the at least one of the movement velocity, the movement acceleration, and the orientation, and
determine at least one of (i) historical parameters associated with the predicted position and (ii) historical parameters associated with the at least one of the predicted movement velocity, the predicted movement acceleration, and the predicted orientation; and
in the adjusting, the processor is further configured to adjust the at least one mode of operation of the mobile terminal based on at least one of (i) the current position, (ii) historical parameters associated with the predicted position, and (iii) the historical parameters associated with the at least one of the predicted movement velocity, the predicted movement acceleration, and the predicted orientation.

19. The mobile terminal of claim 11, wherein in the generating the predicted network performance parameters, the processor is further configured to:
measure environmental factors surrounding the mobile terminal;
determine current network performance parameters based on the measured environmental factors; and
determine a rolling average for the current network performance parameters, the rolling average indicating an average value of the current network performance parameters that are measured during a desired time interval.

20. A non-transitory computer-readable medium comprising program code, which when executed by a processor, configures the processor to:
adjust at least one mode of operation of a mobile terminal based on predicted network performance parameters,
determine the predicted network performance parameters based on a simulation of a local network, the simulation simulating network conditions surrounding the mobile terminal, the simulated network conditions being determined without requesting network performance information from a network element, and
generate the simulation of the local network based on at least one of (i) a mobile terminal parameter and (ii) environmental information, the at least one of the mobile terminal parameter and the environmental information being measured by the mobile terminal or obtained by the mobile terminal.

* * * * *